Nov. 4, 1952  R. M. RODGER  2,616,772

PISTON

Filed Feb. 3, 1949

INVENTOR.
Robert M. Rodger.
BY
Harness and Harris
ATTORNEYS.

Patented Nov. 4, 1952

2,616,772

UNITED STATES PATENT OFFICE 2,616,772

PISTON

Robert M. Rodger, Grosse Pointe Woods, Mich., assignor to Chrysler Corporation, Highland Park, Mich., a corporation of Delaware Application February 3, 1949, Serial No. 74,316

5 Claims. (Cl. 309—9)

This invention relates to double-headed pistons for double acting, internal combustion engines and the like. In such engines the crankshaft passes through the pistons, intermediate the opposed pressure heads thereof, and is connected to the pistons by means of bearing blocks slidably mounted in slideways located interiorly of the pistons. It has been found that engines using pistons of the aforementioned type are quite noisy in operation due to the relatively large clearances that developed between the slidably engaged bearing blocks as a result of thermal expansion of the slidably engaged parts. The thermal expansion of the slidably engaged parts is caused by the ready transfer of heat from the opposed piston heads to other portions of the piston during operation of the engine.

It is a primary object of this invention to so construct a double-headed piston that the structural arrangement thereof will compensate for the thermal deformations of the piston during engine operation and thus maintain the clearances between the slidably engaged bearing block and the slideways at a minimum.

It is a further object of this invention to provide a piston of the type having a transversely disposed bearing block slideway supported interiorly of the piston wherein the transversely extending slideways are disconnected from the piston skirt so as to render the slideway more flexible and at the same time reduce the transfer of heat from the piston head to the piston skirt and thus permit the use of minimum clearances between the piston skirt and the surrounding cylinder wall.

It is another object of this invention to so arrange the slideway supporting struts within the piston that heat is transferred to the slideways from the piston heads in such a manner that the bearing block bore or diameter is maintained at a minimum during engine operation yet is sufficiently large at engine starting to prevent seizure of the slidably engaged elements.

It is a further object of this invention to provide a piston of the internal slideway type where a majority of the heat from the piston head is readily transmitted to the internal slideway while a minimum of head heat is transmitted to the piston skirt.

It is a still further object of this invention to form a piston of the internal slideway type wherein the skirt portion is so formed that a minimum portion thereof is connected to the head portion and provision is made for maximum air circulation within the interior of the piston to maintain the piston skirt relatively cool.

It is a further object of this invention to provide an internal slideway type of piston in which the slideway is disconnected from the piston skirt so as to give a more flexible skirt portion that can readily adapt itself to the shape of the cylinder bore and thus improve the fit between the piston and cylinder bore.

It is an additional object of this invention to provide an internal slideway type of piston having the slideway disconnected from the skirt portion but so connected with the head portion that the difference in thermal expansion between the slideway structure and the skirt portion will keep the clearances between the slidably engaged elements to a minimum during engine operation.

Other objects and advantages of this invention will become readily apparent from reading of the following description and a consideration of the attached drawings in which.

Figures 1, 2, 3:
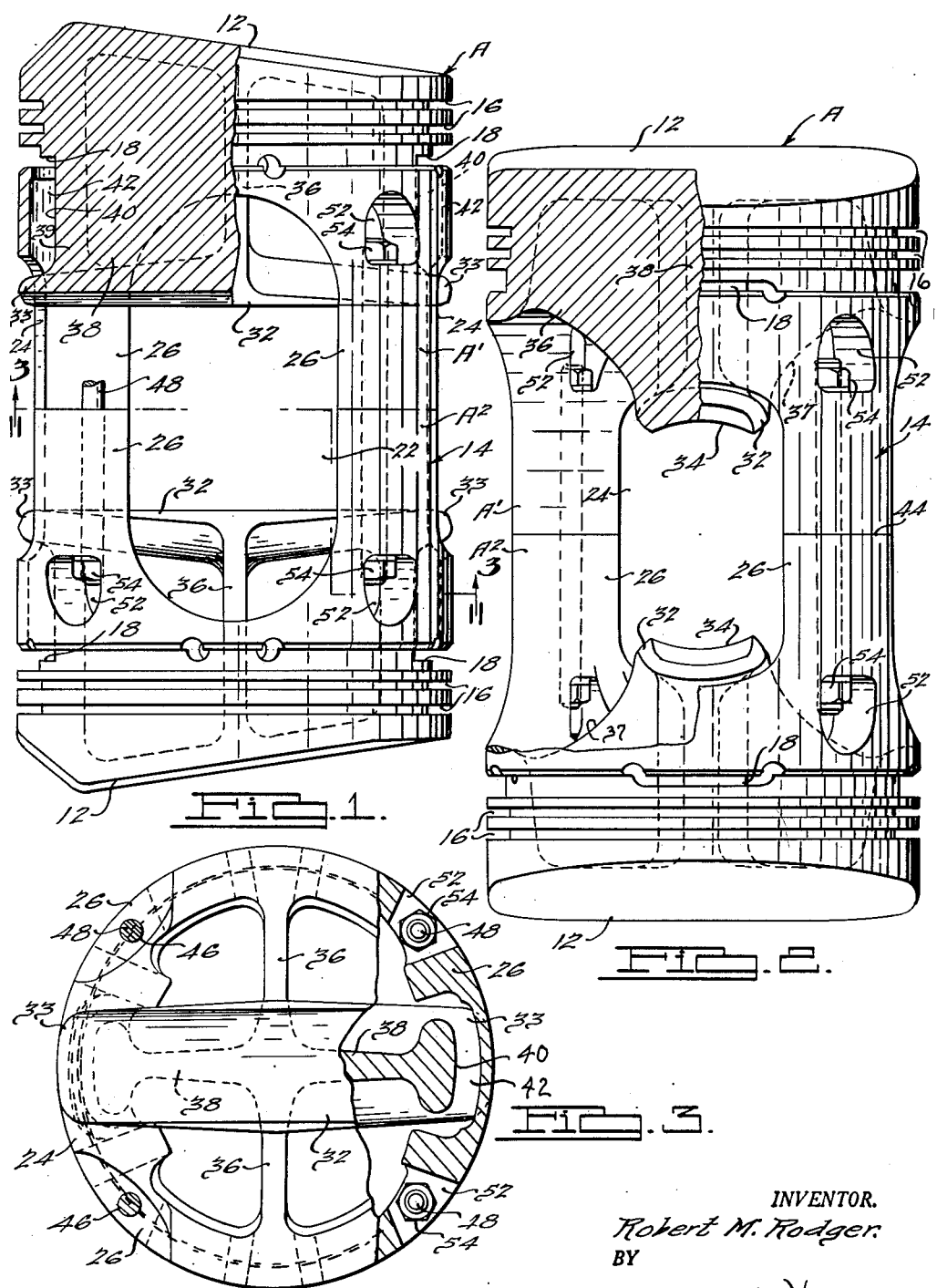
Fig. 1 is a side elevation with portions broken away and partly in section, of a double-headed, internal slideway type of piston embodying this invention.
Fig. 2 is a side elevation of the piston shown in Fig. 1 taken along a plane at right angles to the plane of Fig. 1, certain parts of the piston being broken away and shown in section.
Fig. 3 is a sectional elevation of the piston taken along the line 3—3 of Fig. 1.

In a double-acting type of internal combustion engine a double-headed piston is employed for reciprocating movement in each cylinder bore, the engine being designed to provide a combustion chamber at each end of each cylinder to cooperate with each end or head of each piston. Engines of this type employ a crankshaft which threads through the skirt portions of the pistons and is directly connected to the pistons without the use of a conventional connecting rod. The connection of the crankshaft to the pistons is by means of bearing blocks journaled on the crankshaft and slidably engaged with a pair of slideways supported interiorly of the pistons.

One of the difficulties encountered with engines of this type has been the inability to maintain sufficiently close clearances between the piston slideways and the crankshaft bearing block during engine operation so as to keep slap and engine noise to a minimum. It has been found that with conventional double-headed pistons the combustion heat from the two opposed piston heads is readily transmitted to the piston skirt and to the interior slideways and these portions of the piston expand and tend to enlarge the clearances between the bearing block and the slideways with the result that these slidably engaged parts begin to slap and create noise as well as damage to the slidably engaged piston surfaces. It is thought to be obvious that this problem is more acute in an engine using double-headed pistons than in one using the conventional single headed piston because of the two heated head portions and the reduced cooling areas within the interior of double ended pistons. As the skirt of the double-headed piston is much longer than the slideway struts, the combustion heat will ordinarily cause the skirt to expand more than the struts supporting the slideways therefore it is obvious that the clearances between the bearing block and slideways will be opened up during engine operation. Furthermore, if the oppositely disposed ends of the slideways are connected to the piston skirt then inward expansion longitudinally or axially of the piston by the slideways is retarded by the skirt connection and the situation is even more aggravated for the ends of the slideways are bent towards the piston heads by the heat of combustion. This invention overcomes the aforementioned difficulties and provides an improved construction that lends itself to quiet, efficient, operation of an engine using double-ended internal slideway type pistons.

The letter A represents a double-ended piston structure having a cylindrical or disc-like head portion 12 at each end thereof and a slotted, substantially cylindrically shaped, sleeve-like skirt portion 14 extending between and connecting the spaced head portions 12. Each head portion 12 along its peripheral edges is formed with a depending flange having a spaced set of circumferentially extending piston ring grooves 16. At each end of the piston A, adjacent the connection of the skirt 14 to the heads 12, the skirt 14 is formed with sets of circumferentially extending, heat insulating, slots 18. The slots 18 pierce the skirt wall and tend to retard or prevent the flow of heat from the piston heads 12 axially into the piston skirt portion 14 and this tends to keep the piston skirt portion relatively cool. The lengths of the insulating slots 18 may vary but in the preferred construction they are as long as possible. The factor which primarily limits the length of the slots 18 is the strength of the connection between the opposed heads 12 and the connecting skirt element 14. By providing means for keeping the piston skirt relatively cool it is possible to set the initial clearances between the piston skirt thrust or bearing portions and the cylinder bore much closer than would otherwise be the case and accordingly a less noisy and more efficient engine is provided. Obviously, a heat insulating material could be used in place of the slots 18 to retard heat flow into the skirt. Such is considered within the scope of this invention.

The piston structure A also has its skirt portion 14 formed with diametrically disposed pairs of axially extending slots 22 and 24 respectively. The slots 22 are displaced circumferentially ninety degrees from the slots 24. Slots 22 are adapted to receive the crankshaft (not shown) which is threaded through the piston skirt so as to extend transversely of the longitudinal axis of the piston. Slots 24 facilitate assembly of the crankshaft and piston and provide space for the reciprocation of the crankshaft bearing block (not shown) which is slidably mounted within the piston structure A on slideways to be subsequently described. Positioned between the circumferentially spaced slots 22 and 24 of the piston skirt portion 14 are axially extending pier sections 26 which connect the opposed piston heads 12. Additional description of the pier sections 26 appears subsequently.

Depending from each piston head 12, interiorly of the piston structure A, is a slideway portion 32. Each slideway portion 32 extends transversely of the longitudinal axis of the piston structure A and is supported from the associated piston head 12 by means of the crossed struts 36 and 38 respectively. Struts 36 sweep radially outwardly from the slideway 32 towards the associated piston head 12 as clearly shown at 37 in Fig. 2, whereas struts 38 are of full depth throughout the length of the slideway 32 as clearly indicated at 39 of Fig. 1. By this arrangement the heat of the piston head 12 may be readily transferred to the slideway 32 by the struts 36 and 38 with relatively little heat being transferred directly from the piston head 12 to the piston skirt 14. It is preferable that the piston head 12 and the slideway supporting struts 36, 38 be formed from material having a relatively high coefficient of expansion within the temperature range of the combustion chamber of the conventional internal combustion engine so that the full benefits of thermal expansion of the struts may be utilized. It will be noted that the ends 33 of the slideway portions 32 extend into the diametrically disposed slots 24 in the piston skirt 14 but are disconnected from the adjacent skirt portion. This arrangement of the struts and slideway prevents transfer of heat from the slideways 32 to the skirt portion 14 and tends to keep the skirt portion relatively cool during engine operation. It will also be noted that the struts 38 at their side edges 40 are spaced from the adjacent skirt portion 14 so as to provide an air circulation space 42 on the inner side of the skirt to help maintain the skirt at a relatively low temperature. By having the ends 33 of the slideways 32 disconnected from the piston skirt portion 14 the slideways are rendered more flexible and are free to thermally expand axially towards the crankshaft mounted therebetween due to the transfer of heat from the piston heads to the slideways and their supporting struts during engine operation. The relatively large thermal expansion of the slideway struts during engine operation, due to combustion heat, and the relatively small piston skirt expansion resulting from the partially insulated piston skirt design herein disclosed tends to reduce to a minimum during engine operation the clearances between the slidably engaged crankshaft bearing block and the piston slideways 32 and thus provides a smoothly operating, relatively noiseless engine. Due to the thermal expansion of the slideway struts 36, 38 reducing the clearances between the crankshaft bearing block and the slideways 32 during engine operation, it is obvious that thermal contraction will prevent seizure of these elements when the engine is cold or during engine start.

The exposed bearing faces 34 of the slideways 32 are fragmentary cylindrical sections that provide bearing surfaces facing each other and spaced apart a distance slightly greater than the diameter or width of the mating bearing block that is mounted on the crankshaft associated with the piston. The axis of the curved slideway bearing faces 34 is transversely of and normal to the longitudinal axis of the piston structure A.

In the present embodiment of this invention the piston structure A is formed of two similar half portions $A^1$ and $A^2$ which are seated on each other along the plane indicated by the numeral 44. The exposed end faces of the pier sections 26 provide seats for the opposed piston portions $A^1$ and $A^2$. In order to secure the piston portions $A^1$ and $A^2$ together the pier sections 26 of the component piston portions are formed with coaxially extending bores 46 adapted to receive the tie bolts 48. The opposite threaded ends of tie bolts 48 are arranged so as to be exposed in the piston skirt openings 52. Nuts 54 are threaded on the exposed ends of the tie bolts 48 to lock the piston portions $A^1$ and $A^2$ together in assembled relationship.

The built-up type of piston herein disclosed is an improvement upon a similar type of piston originally disclosed in the application of John P. Butterfield, Serial Number 16,645, filed March 24, 1948. The built-up piston facilitates assembly of an engine of the double-acting type when a one-piece crankshaft is used. Obviously, if a sectional crankshaft is used then the novel piston structure herein disclosed could be incorporated in an integrally cast, one-piece piston of the type disclosed in the application of Alexander G. Herreshoff, Serial Number 16,801, filed March 24, 1948.

I claim:

1. A double-ended piston comprising opposed, substantially cylindrical heads connected by a hollow, substantially cylindrical, sleeve-like skirt portion, a pair of spaced bearing block slideways mounted interiorly of the piston and extending transversely of the piston skirt portion but disconnected therefrom, each slideway being supported by and connected to a piston head by axially extending, heat transmitting struts that are free of connection with said skirt portion, and circumferentially extending heat retarding means carried by said skirt portion adjacent each head portion substantially encircling said head portions adapted to retard the flow of heat from the heads to the skirt portion.

2. A double-ended piston comprising opposed heads, a sleeve-like skirt connecting the opposed heads, a pair of axially spaced bearing block slideways arranged interiorly of the piston skirt and extending transversely thereof but disconnected therefrom, each slideway being connected to a piston head by an axially extending heat transmitting strut that is disconnected from the piston skirt, and circumferentially extending slots through said piston skirt adjacent each head substantially encircling said heads and adapted to retard the flow of heat from the heads to the skirt and to direct the flow of heat from the skirt and to direct the flow of heat from the heads through the struts to the slideways.

3. A double-ended piston comprising opposed heads and a hollow connecting skirt portion extending therebetween, a slideway structure within the skirt extending transversely thereof but disconnected therefrom, said slideway structure being supported from at least one of the heads by heat transmitting strut means having a relatively large coefficient of expansion, said slideway supporting means being free of contact with said skirt, and means integral with said skirt and extending circumferentially thereof adjacent each head adapted to direct the majority of the head heat to the slideway supporting means and to keep to a minimum the head heat transmitted to the skirt.

4. A double-ended piston for an internal combustion engine comprising axially spaced, disc-like heads each formed with a ring-like flange depending from the periphery thereof, a substantially cylindrical, hollow, skirt connected between the ring flanges of the spaced heads along spaced, circumferentially extending, portions and separated from said head flanges along other spaced, circumferentially extending portions, axially extending slots piercing said skirt, a slideway supported from the interior side of each head by heat transmitting supporting means having a relatively high coefficient of expansion, said slideways extending transversely of the skirt portion but disconnected therefrom and said slideway supporting means likewise being disconnected from said skirt.

5. A piston having opposed, disc-like, heads and a hollow, sleeve-like skirt connecting said heads, said skirt having circumferentially extending slots adjacent each head connection and axially extending slots between said circumferentially extending slots, a pair of opposed, slideways supported by said heads and supported from the interior sides of each head and arranged to extend transversely of the skirt in axially spaced relationship, the slideway supporting means being located within said skirt and free of connection therewith and the ends of said slideways being located in the axially extending slots in the skirt, said slideways being formed of material adapted to expand by the transfer of heat thereto from the piston heads by said slideway supporting means, the circumferentially extending slots in the skirt preventing an equivalent expansion of the skirt portion by retarding the flow of heat thereto from the opposed heads.

ROBERT M. RODGER.

REFERENCES CITED

The following references are of record in the file of this patent:

UNITED STATES PATENTS

| Number | Name | Date |
| --- | --- | --- |
| 1,042,505 | Twombly | Oct. 29, 1912 |
| 1,494,483 | Howe | May 20, 1924 |
| 2,190,207 | Dillon | Feb. 13, 1940 |
| 2,494,748 | Ernestus | Jan. 17, 1950 |

FOREIGN PATENTS

| Number | Country | Date |
| --- | --- | --- |
| 375,961 | Great Britain | July 7, 1932 |